United States Patent
Kushibe

(10) Patent No.: US 6,622,906 B1
(45) Date of Patent: Sep. 23, 2003

(54) WELDING METHOD AND WELDING DEVICE

(75) Inventor: Norishige Kushibe, Niihama (JP)

(73) Assignee: Shinwa Kosan Co., Ltd., Ehime (JP)

( * ) Notice: Subject to any disclaimer, the term of this patent is extended or adjusted under 35 U.S.C. 154(b) by 5 days.

(21) Appl. No.: 10/019,109

(22) PCT Filed: Jun. 23, 2000

(86) PCT No.: PCT/JP00/04168

§ 371 (c)(1),
(2), (4) Date: Dec. 21, 2001

(87) PCT Pub. No.: WO00/78494

PCT Pub. Date: Dec. 28, 2000

(30) Foreign Application Priority Data

Jun. 23, 1999 (JP) ............................................. 11-176495

(51) Int. Cl.[7] ........................... B23K 37/04; B23K 31/02
(52) U.S. Cl. ..................... 228/212; 228/44.3; 228/49.2; 219/124.31; 219/159
(58) Field of Search ................................ 228/212, 213, 228/44.3, 45, 47.1, 49.1, 49.2, 49.4, 48; 219/86.24, 121.82, 124.31, 158, 159, 160, 161; 901/42

(56) References Cited

U.S. PATENT DOCUMENTS

| | | | | |
|---|---|---|---|---|
| 4,369,958 A | * | 1/1983 | Maynard | 269/61 |
| 4,653,739 A | * | 3/1987 | Moore | 269/61 |
| 4,843,904 A | * | 7/1989 | Moore | 74/396 |
| 4,885,833 A | * | 12/1989 | Umegai et al. | 29/407.05 |
| 4,979,854 A | * | 12/1990 | Kurita et al. | 409/84 |
| 5,083,070 A | * | 1/1992 | Poupard et al. | 318/568.1 |
| 5,337,938 A | * | 8/1994 | Gilbert | 228/102 |
| 5,350,895 A | * | 9/1994 | Tanitomi | 219/124.31 |
| 5,524,510 A | * | 6/1996 | Davies et al. | 76/108.2 |
| 5,622,084 A | * | 4/1997 | Tellden | 74/490.03 |
| 5,679,055 A | * | 10/1997 | Greene et al. | 451/10 |
| 5,704,601 A | * | 1/1998 | Mangelsen et al. | 269/57 |
| 6,036,082 A | * | 3/2000 | Caldarone | 228/212 |
| 6,283,361 B1 | * | 9/2001 | Maki et al. | 228/212 |
| 6,375,178 B1 | * | 4/2002 | Schilb et al. | 269/71 |
| 6,380,512 B1 | * | 4/2002 | Emer | 219/121.71 |
| 6,431,949 B1 | * | 8/2002 | Ishikawa et al. | 451/5 |

FOREIGN PATENT DOCUMENTS

| | | |
|---|---|---|
| JP | 54-106227 | 7/1979 |
| JP | 63-43772 | 2/1988 |
| JP | 4-262873 | 2/1991 |
| JP | 405318119 A | * 12/1993 |
| JP | 6-126446 | 5/1994 |
| JP | 7-246494 | 9/1995 |

* cited by examiner

Primary Examiner—Tom Dunn
Assistant Examiner—Kiley Stoner
(74) Attorney, Agent, or Firm—Merchant & Gould P.C.

(57) ABSTRACT

The welding apparatus has a positioner (1) provided with workpiece supporting means (11) which is rotatable about a first central axis (Ca) and is pivotable up and down about a second central axis (Cb) crossing the first central axis (Ca). A welding robot (2) includes a robot body (20) mounted on the workpiece supporting means (11). Therefore, even when the workpiece supporting means (11) operates, it is possible to prevent a torch (3) carried by the robot body (20) from positionally deviating relative to a workpiece (W) supported on the work supporting means (11).

8 Claims, 7 Drawing Sheets

WELDING METHOD AND WELDING DEVICE

TECHNICAL FIELD

The present invention relates to a method and an apparatus for performing welding with respect to a workpiece.

BACKGROUND ART

FIG. 9 illustrates an example of prior art welding apparatus. The illustrated welding apparatus comprises a combination of a positioner 8 and a welding robot 9. The positioner 8 is of a so-called trunnion type and includes a rotary table 80 supported on a base frame 81. The rotary table 80 is rotatable about both of two axes C1, C2. The axis C2 extends perpendicularly to the sheet surface. The rotary table 80 has an upper surface for mounting a workpiece W. The welding robot 9 comprises a robot body 90, and a controller 91 including a teaching box for controlling the robot body 90. The robot body 90 has an articulated structure which includes a plurality of arms 90a–90c connected together for rotation relative to each other. The arm 90c has a tip end which carries a welding torch 3. The robot body 90 is mounted independently of the positioner 8.

With the welding apparatus having the above-described structure, it is possible to set the workpiece W at a position or in a posture suitable for welding by operating the rotary table 80 of the positioner 8. For example, a fillet portion Wb of the workpiece W can be oriented upwardly by inclining the rotary table 80 as illustrated in the figure. In this state, welding for the fillet portion Wb can be performed with the torch 3 oriented vertically or generally vertically downward for facing the fillet portion Wb. If the torch 3 is oriented horizontal or upward in arc welding, a failure may occur in welding. However, the welding apparatus having the above-described structure can eliminate the possibility of such a failure. Further, by performing welding with the fillet portion Wb oriented upward, it is possible to prevent a weld bead from localizing at one side of the fillet portion Wb.

However, the above-described prior art welding apparatus has the following drawbacks.

In the above-described structure, the robot body 90 is mounted independently of the positioner 8. Therefore, when an error of the rotational angle occurs in rotating the rotary table 80 about the shaft C2 through a predetermined angle, the position of the workpiece W relative to the robot body 90 deviates from the intended position. In rotating the rotary table 80, the moving amount of a specific portion of the workpiece W is the product of the distance from the rotational center of the rotary table 80 to that specific portion and the rotational angle (radian) of the rotary table 80. Therefore, even when the rotational angle error is small, the error of the moving amount may be large at a portion located relatively far from the rotational center of the rotary table 80. As a result, the positional deviation of the workpiece W relative to the robot body 90 may be significant. When the welding robot 9 is operated in this state, a failure occurs in welding.

In this way, in the above-described prior art apparatus, a welding failure due to an error of the movement of the positioner 8 occurs when the positioner 8 and the welding robot 9 are controlled independently of each other. To eliminate the possibility of such a failure, it is necessary to utilize numerical control not only for the welding robot 9 but also for the positioner 8 so that the welding robot 9 and the positioner 8 are controlled in highly precise relationship. However, such an arrangement is costly because it requires an expensive positioner 8 as well as a control program for the positioner 8. Further, the positioner 8 and the welding robot 9 must undergo a complicated teaching process to result in difficulty of handling the apparatus.

Other examples of prior art welding apparatuses are disclosed in JP-A-4-262873 and JP-A-9-277050. Either of these welding apparatuses comprises a first table movable in one direction and a second table mounted on the first table for supporting a workpiece. The second table is movable in a direction which is different from the moving direction of the first table. A robot body of a welding robot is mounted on the first table. With this structure, a change in the posture or orientation of the workpiece caused by a movement of the second table also results in a change in the relative positional relationship between the workpiece supported on the second table and the robot mounted on the first table. Therefore, the welding apparatuses disclosed in the above-identified publications have the same drawbacks as those of the prior art apparatus shown in FIG. 9.

DISCLOSURE OF THE INVENTION

An object of the present invention is to provide a welding method and a welding apparatus capable of eliminating or lessening the problems of the above-described prior art.

According to a first aspect of the present invention, there is provided a welding method for performing welding with respect to a workpiece by using a positioner provided with workpiece supporting means which is rotatable about a first central axis and is pivotable up and down about a second central axis crossing the first central axis, and a welding robot including a robot body for moving a torch, wherein the welding is performed with both the workpiece and the robot body carried by the workpiece supporting means.

According to a second aspect of the present invention, there is provided a welding apparatus comprising a positioner provided with workpiece supporting means which is rotatable about a first central axis and is pivotable up and down about a second central axis crossing the first central axis, and a welding robot including a robot body for moving a torch, wherein the robot body is carried by the workpiece supporting means.

According to the present invention, the robot body of the welding robot is carried by the workpiece supporting means of the positioner. Therefore, it is possible to prevent the positional relationship between the workpiece supporting means and the robot body from changing when the workpiece supporting means is operated. Accordingly, it is also possible to prevent the robot body from changing its position relative to the workpiece supported on the workpiece supporting means. Specifically, even when the workpiece supporting means is rotated about the first central axis or pivoted up and down about the second central axis, it is possible to keep unchanged the relative positional relationship between the robot body and the workpiece. As a result, according to the present invention, even when any error occurs in the operation of the work supporting means, it is possible to locate the torch at a position close to and in facing relationship to an intended portion of the workpiece without being influenced by the error.

Therefore, unlike the prior art apparatus, it is possible, in the present invention, to eliminate or lessen the need for controlling the positioner in highly precise relationship to the robot body. Thus, use may be made of an inexpensive positioner. Further, it is possible to dispense with a program for numerical control of the positioner or to make the content of such a program simpler. Moreover, the welding apparatus needs only to undergo a simpler teaching process.

Of course, by the operation of the positioner, it possible to set the posture or orientation of the workpiece suitably for the welding operation by the welding robot, so that welding can be performed appropriately according to the present invention.

Preferably, the robot body my comprise a base, and a plurality of arms a base end supported by the base and connected to each other for relative rotation. The plurality of arms also have a three-dimensionally movable tip end which is provided with holding means for holding the torch.

With this structure, the robot body is capable of three-dimensionally moving the torch, which is suitable for performing various types of welding operation.

Preferably, the welding apparatus may further comprise robot moving means supporting the base of the robot body for moving the robot body on or above the workpiece supporting means.

With this structure, it is possible to move the entire robot body to a position suitable for welding depending on the configuration or size of the workpiece. Therefore, this structure is suitable for performing welding for plural kinds of workpieces which differ from each other in configuration or size.

Preferably, the robot moving means may comprise a frame including at least one post standing from the workpiece supporting means and a beam extending from an upper portion of the post in a direction crossing the first central axis. The robot moving means may also comprise a support member for supporting the base of the robot body. The support member may be movable longitudinally of the beam while being guided by the beam.

With this structure, it is possible to move the robot body above the workpiece supporting means in a direction crossing the first central axis. Therefore, it is possible to locate the robot body relative to the workpiece at a position suitable for the welding operation.

Preferably, the frame may be movable in a direction crossing the longitudinal direction of the beam.

With this structure, it is possible to move the robot body longitudinally of the beam as well as in the direction crossing the longitudinal direction of the beam. Therefore, this structure is more preferable for locating the robot body at a position suitable for the welding.

Preferably, the base of the robot body may be fixedly mounted on the workpiece supporting means.

Preferably, the robot body may be mounted on the workpiece supported on the workpiece supporting means for causing the workpiece supporting means to carry the robot body.

According to a third aspect of the present invention, there is provided a welding method for performing welding with respect to a workpiece by using a positioner for changing posture or orientation of the workpiece and a welding robot including a robot body for moving a torch, wherein the welding is performed with the robot body being mounted on the workpiece.

Also with this welding method, it is possible to keep the relative positional relationship between the workpiece and the robot body unchanged during the operation of the positioner. Therefore, it is possible to obtain the same advantages as those obtained by the welding method and the welding apparatus according to the first and the second aspects of the present invention.

Other features and advantages of the present invention will become clearer from the detailed description given below with reference to the accompanying drawings.

BEST MODE FOR CARRYING OUT THE INVENTION

Preferred embodiments of the present invention will be described below with reference to the accompanying drawings.

Figure 1:
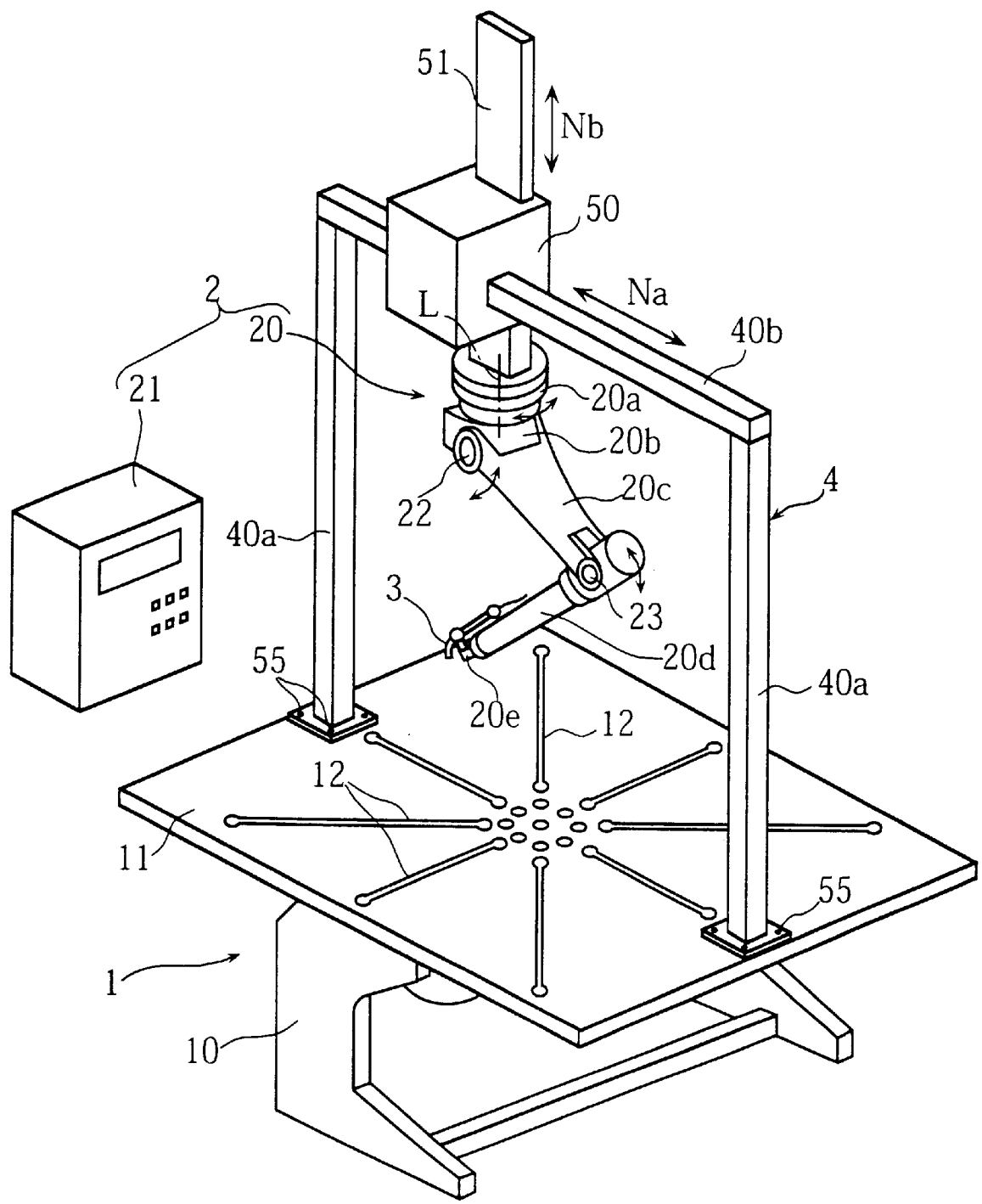
FIG. 1 is a perspective view showing a first embodiment of welding apparatus according to the present invention.
Figure 2:
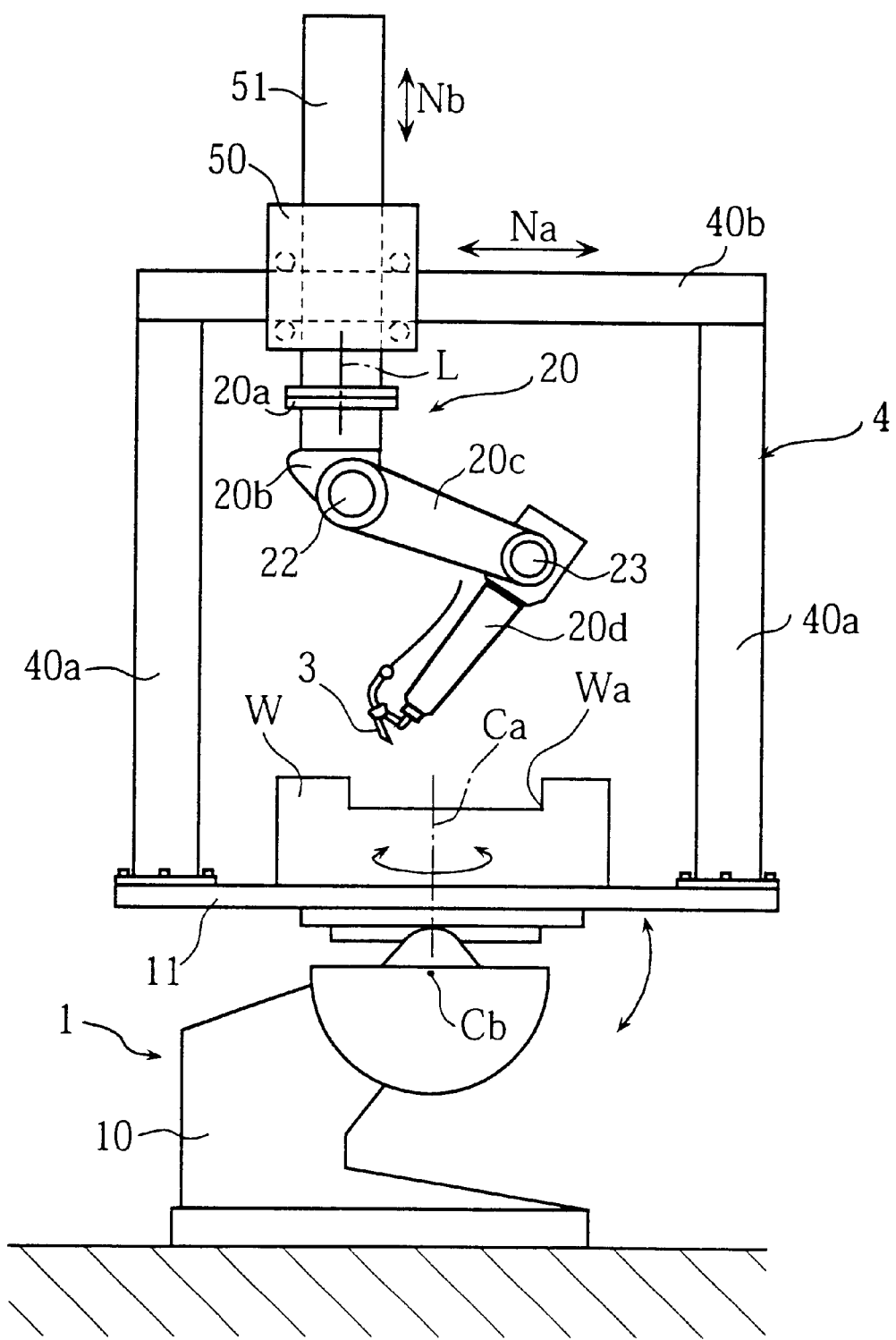
FIG. 2 is a front view showing the welding apparatus of FIG. 1 to which a workpiece is mounted.
Figure 3:
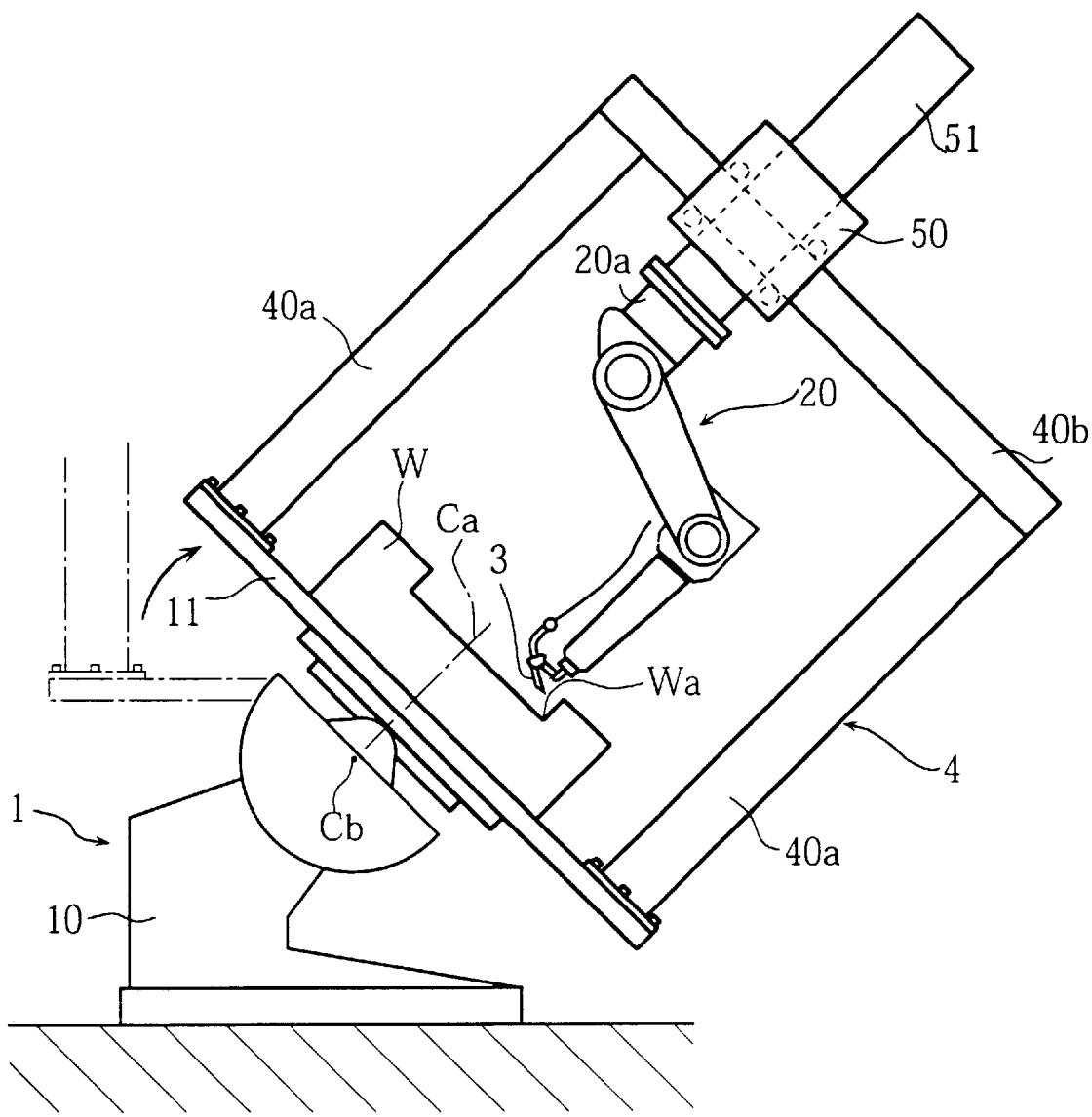
FIG. 3 is a front view illustrating an example of operation of the welding apparatus shown in FIG. 1.

FIGS. 1 through 3 illustrate a first embodiment of welding apparatus according to the present invention.

As clearly shown in FIG. 1, the welding apparatus of this embodiment comprises a positioner 1 and a welding robot 2. The positioner 1, which may be of a trunnion type similarly to the above-described prior art positioner, includes a rotary table 11 mounted on a base frame 10. As shown in FIG. 2, the rotary table 11 is rotatable about a first central axis Ca extending through the center of the rotary table 11 and also about a second central axis Cb extending perpendicularly to the first central axis Ca (i.e. perpendicularly to the sheet surface). The rotation about the second central axis Cb is pivotal movement about the axis. As clearly shown in FIG. 1, the rotary table 1 may be rectangular or circular for example and has an upper surface formed with a plurality of T-grooves for fixedly mounting workpieces. Each of the T-grooves 12 receives part of a T-bolt (not shown) serving as a jig for fixing the workpiece. By utilizing the T-bolt as well as a nut for screwing onto the T-bolt, a desired workpiece is fixedly mounted on the rotary table 11.

The welding robot 2 comprises a robot body 20, and a controller 21 including a teaching box for controlling the operation of the robot body 20. The controller 21 is disposed beside the positioner 1, whereas the robot body 20 is mounted on the rotary table 11. The robot body 20 may have an articulated structure and comprises a base 20a, a first arm 20b rotatable relative to the base 20a about a vertically extending central axis L, a second arm 20c rotatable relative to the first arm 20b about a shaft 22, and a third arm 20d rotatable relative to the second arm 20c about a shaft 23. The third arm 20d has a tip end provided with a holder 20e for holding a torch 3 for arc welding. The robot body 20 operates to move the torch 3 three-dimensionally while controlling the posture and orientation of the torch 3 as desired.

The upper surface of the rotary table 11 is provided with a gate-shaped frame 4 mounted thereon. The frame 4 includes two posts 40a standing from the rotary table 11, and a beam 40b connecting respective upper portions of the posts 40a to each other. The beam 40b is provided with a carriage 50c capable of reciprocally traveling longitudinally of the beam 40b (in the arrow Na directions). The carriage 50 is provided with a support 51 which is movable up and down in the arrow Nb directions. The base 20a of the robot body 20 is attached to the lower end of the support 51. Therefore, the entire robot body 20 is movable above the rotary table 11 in the arrow Na directions and in the arrow Nb directions. The arrow Na extends perpendicularly to the first central axis Ca of the positioner 1. The frame 4 may be detachably mounted to the rotary table 11 with a plurality of bolts 55 for example. With this structure, the frame 4 and the robot body 20 can be appropriately detached from the rotary table 11 for maintenance. However, the frame 4 may be fixed to the rotary table 11 so as not to allow detachment.

To be described next is a welding method using the above-described welding apparatus according to the present invention.

First, as shown in FIG. 2, a workpiece W is fixedly disposed on the rotary table 11 which is set horizontal. Thereafter, when welding is to be performed for a fillet portion Wa where two surfaces adjoin, the rotary table 11 is inclined through, for example, 45 degrees as shown in FIG. 3. By this inclination, the fillet portion Wa is oriented upward to make the two surfaces defining the fillet portion generally equal to each other in inclination angle. On the other hand, the robot body 20 operates to make the torch 3 come close to the upwardly oriented fillet portion Wa with the torch 3 oriented vertically or generally vertically downward. In this state, the welding for the fillet portion Wa is performed.

The robot body 20 is mounted on the rotary table 11. Therefore, even when the rotary table 11 is inclined through 45 degrees as described above, the relative positional relationship between the robot body 20 and the rotary table 11 or the workpiece W can be kept unchanged from its initial positional relationship shown in FIG. 1 as long as the position of the base portion 20a of the robot body 20 remains unchanged. Therefore, the operation of the rotary table 11 does not result in a change in the relative positional relationship between the robot body 20 and the workpiece W. Thus, by controlling the robot body 20 to bring the torch 3 close to the fillet portion Wa of the workpiece W while keeping a predetermined spacing therefrom, the torch 3 can be always located precisely at a predetermined position relative to the fillet portion Wa regardless of the inclination angle of the rotary table 11. Specifically, even when a slight inclination angle error occurs in inclining the rotary table 1 through 45 degrees as shown in FIG. 3, the torch 3 can be held close to the fillet portion of the workpiece W while being oriented vertically or generally vertically downward, thereby causing the torch 3 to reliably weld the fillet portion Wa.

In this way, with the welding apparatus of this embodiment, the relative positional relationship between the robot body 20 and the workpiece W does not change due to the influence of the operation of the positioner 1. Therefore, the positioner 1 need not be controlled in highly precise relationship to the robot body 20. Thus, use may be made of an inexpensive positioner 1 of the type wherein the posture of the rotary table 11 is manually changed. Even if the positioner 3 is to be controlled numerically, rough control is sufficient to facilitate such control.

Since the robot body 20 of the welding apparatus of this embodiment is movable in the arrow Na directions and the arrow Nb directions, the robot body 20 can be located at a position suitable for welding. Moreover, in mounting or dismounting the workpiece W with respect to the rotary table 11, the robot body 20 can be retreated to a position which does not hinder such operation.

FIGS. 4 through 8 illustrates other embodiments of welding apparatus according to the present invention. In these figures, the elements which are identical or similar to those of the first embodiment are designated by the same reference signs as those used for the first embodiment.

Figure 4:
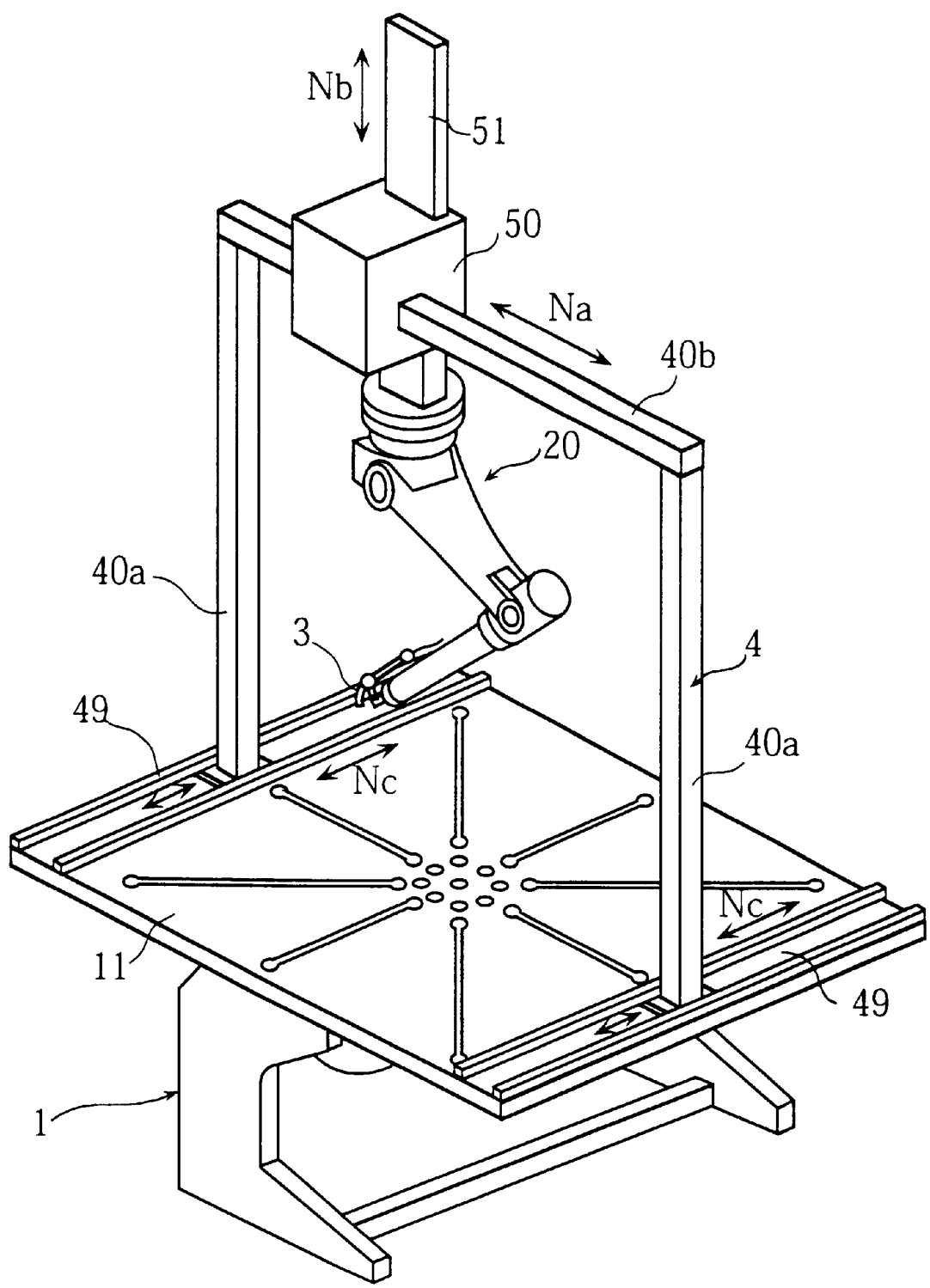
FIG. 4 is a perspective view showing a second embodiment of welding apparatus according to the present invention.

In the welding apparatus shown in FIG. 4, a pair of rails 49 are mounted on the rotary table 11 for guiding the movement of the frame 4. Owing to such guide by the rails 49, the frame 4 is movable in the arrow Nc directions which cross the longitudinal direction of the beam 40b. For instance, each of the posts 40a of the frame 4 may be provided, at the bottom thereof, with a wheel driven by a motor for enabling automatic traveling of the frame 4. Alternatively, the bottom of the post 40a may be normally fixed with bolts, and the frame 4 may be manually moved as required by loosening the bolts.

With the welding apparatus shown in FIG. 4, the moving range of the robot body 20 is wider than that of the welding apparatus of the first embodiment. Therefore, the welding apparatus of this embodiment is more preferable for locating the robot body 20 at a position suitable for welding the workpiece.

Figure 5:
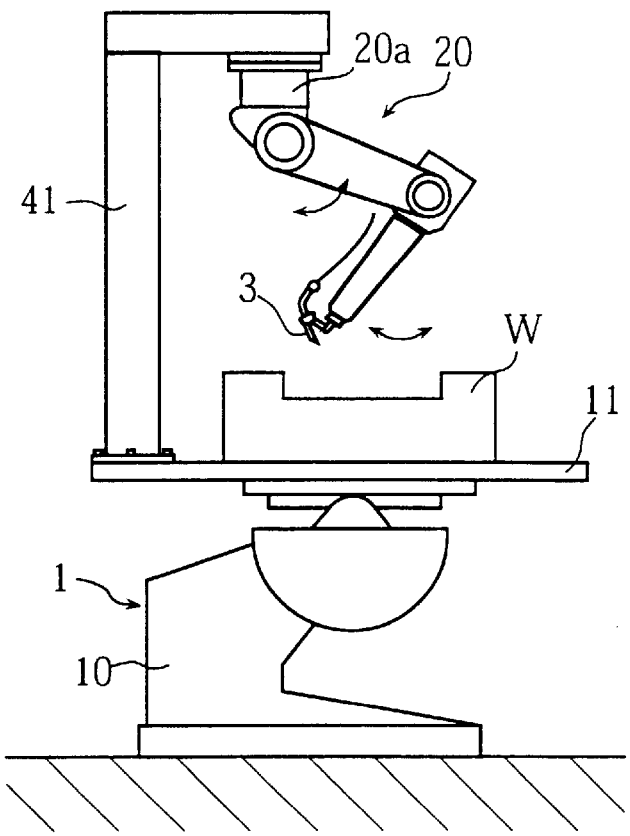
FIG. 5 is a front view showing a third embodiment of welding apparatus according to the present invention.
Figure 6:
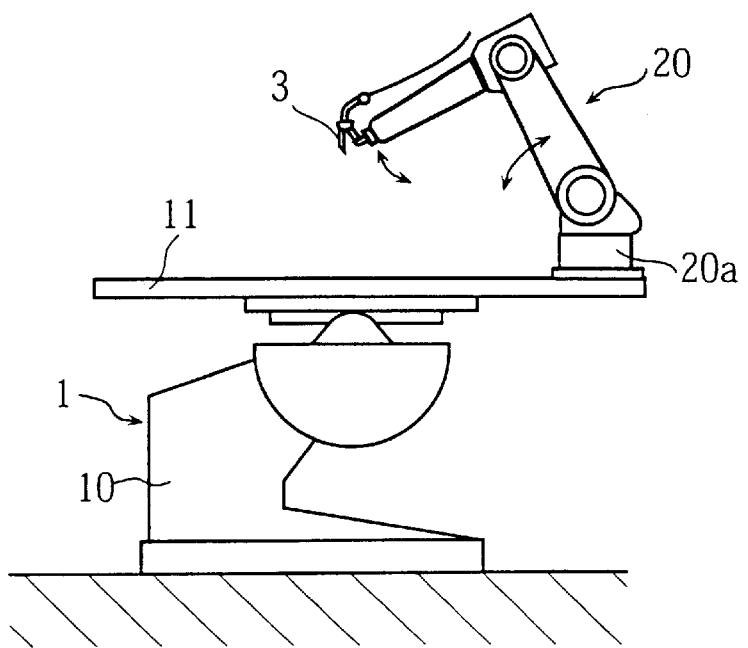
FIG. 6 is a front view showing a fourth embodiment of welding apparatus according to the present invention.

FIG. 5 illustrates a welding apparatus in which the rotary table 11 is provided with a bracket 41 fixedly mounted thereon, to which the base 20a of the robot body 20 is fixed. FIG. 6 illustrates another welding apparatus in which the base 20a of the robot body 20 is directly fixed on the upper surface of the rotary table 11.

Figure 7:
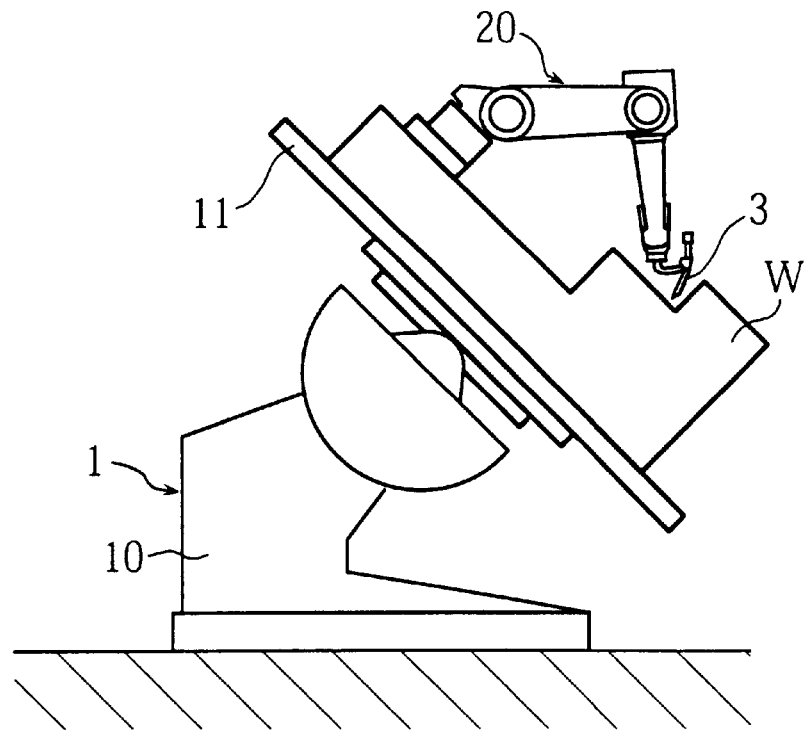
FIG. 7 is a front view showing a fifth embodiment of welding apparatus according to the present invention.
Figure 8:
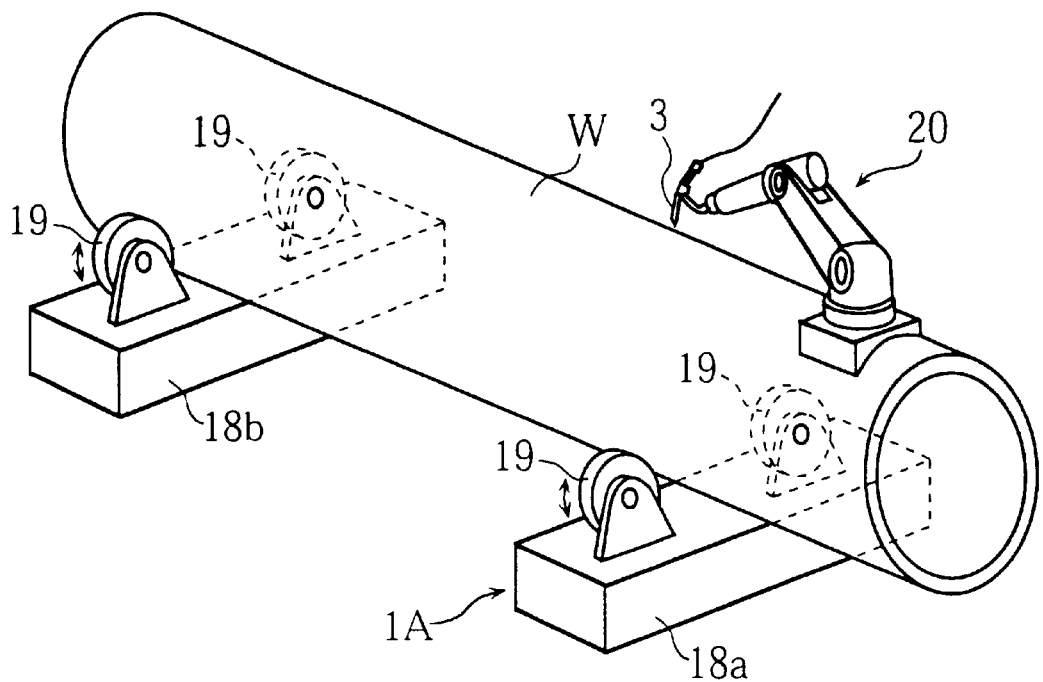
FIG. 8 is a perspective view showing a sixth embodiment of welding apparatus according to the present invention.
Figure 9:
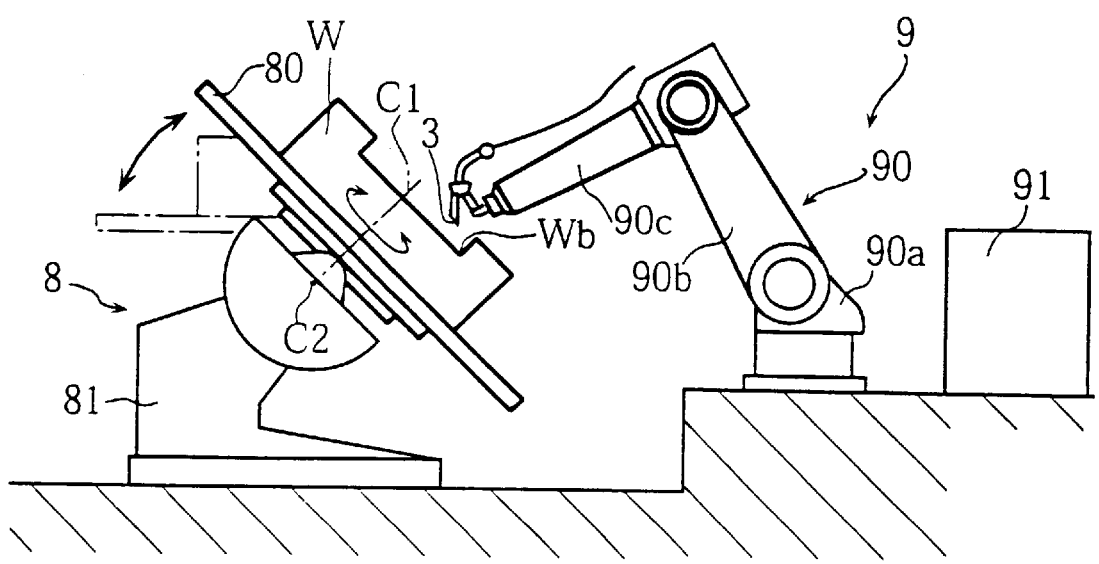
FIG. 9 is a front view showing an example of prior art apparatus.

According to these structures, the robot body 20 is not movable relative to the rotary table 11. However, welding for the workpiece can be performed by the operation of the plurality of arms of the robot body 20. In this way, the robot body 20 may be provided to be immovable relative to the rotary table FIG. 7 illustrates a welding apparatus in which the robot body 20 is mounted on the workpiece W disposed on the rotary table 11. FIG. 8 illustrates a welding apparatus which utilizes a positioner 1A of a so-called turning roll type. The positioner 1A includes two blocks 18a, 18b each of which is provided with a pair of support rollers 19 for rotatably supporting a workpiece roll W. With this positioner, it is possible to support a large workpiece having a great weight of some tens of tons or more. A robot body 20 is mounted to the workpiece roll W.

With these structures, the robot body 20 is mounted on the workpiece W, which means that the robot body 20 is carried by the workpiece supporting member (the rotary table 11 or the support rollers 19) of the positioner 1 or 1A. Therefore, also with these structures, it is possible to prevent the relative positional relationship between the workpiece W and the robot body 20 from changing during the operation of the positioner 1 or 1A. Thus, similarly to the first embodiment, the embodiments shown in FIGS. 7 and 8 can accomplish the objects of the present invention. Preferably, the structure of mounting the robot to the workpiece is employed in the case where the workpiece is large in size. In the embodiments shown in FIGS. 7 and 8, after welding for one portion of the workpiece W is completed, it may be impossible to move the torch 3 to a next portion to be welded of the workpiece W solely by the operation of the arms. In such a case, the robot body 20 may be once detached from the workpiece W and mounted again onto the workpiece W at another position suitable for conducting the welding for the next portion.

The present invention is not limited to the above-described embodiments.

For example, in the case where the robot is mounted on the workpiece, use may be made of a positioner whose degree of freedom is 1, as understood from the structure of the positioner 1A shown in FIG. 8.

In the present invention, the specific structure of the welding robot is not limitative, and use may be made of a welding robot having a structure other than the articulated structure. A plurality of robots may be mounted on the workpiece supporting means of one positioner. The workpiece supporting means may not be in the form of a table. The kind of workpiece to be welded is not limitative.

What is claimed is:

1. A welding method for performing welding with respect to a workpiece by using a positioner provided with workpiece fixing means for fixing the workpiece, the workpiece fixing means being rotatable about a first central axis and pivotable up and down about a second central axis crossing the first central axis, and a welding robot including a robot body for moving a torch, wherein the welding is performed with both the workpiece and the robot body carried by the workpiece fixing means.

2. A welding apparatus comprising a positioner provided with workpiece fixing means for fixing the workpiece, the workpiece fixing means being rotatable about a first central axis and pivotable up and down about a second central axis crossing the first central axis, and a welding robot including a robot body for moving a torch, wherein the robot body is carried by the workpiece fixing means.

3. The welding apparatus according to claim 2, wherein the robot body comprises a base, and a plurality of arms having a base end supported by the base and connected to each other for relative rotation, the plurality of arms also having a three-dimensionally movable tip end, the tip end being provided with holding means for holding the torch.

4. The welding apparatus according to claim 3, further comprising robot moving means supporting the base of the robot body for moving the robot body on or above the workpiece fixing means.

5. The welding apparatus according to claim 4, wherein the robot moving means comprises a frame including at least one post standing from the workpiece fixing means and a beam extending from an upper portion of the post in a direction crossing the first central axis, and a support member for supporting the base of the robot body, the support member being movable longitudinally of the beam while being guided by the beam.

6. The welding apparatus according to claim 5, wherein the frame is movable in a direction crossing the longitudinal direction of the beam.

7. The welding apparatus according to claim 3, wherein the base of the robot body is fixedly mounted on the workpiece fixing means.

8. The welding apparatus according to claim 2, wherein the robot body is mounted on the workpiece supported on the workpiece fixing means for causing the workpiece fixing means to carry the robot body.

* * * * *